UNITED STATES PATENT OFFICE.

HARRY D. GIBBS, OF SAN FRANCISCO, CALIFORNIA.

PROCESS FOR OXIDIZING THE SIDE CHAINS OF AROMATIC HYDROCARBONS.

1,284,887. Specification of Letters Patent. Patented Nov. 12, 1918.

No Drawing. Application filed September 22, 1916. Serial No. 121,597.

(DEDICATED TO THE PUBLIC.)

*To all whom it may concern:*

Be it known that I, HARRY D. GIBBS, a citizen of the United States of America, and an employee of the Department of Agriculture of the said United States, residing in the city of San Francisco, county of San Francisco, State of California, (whose post-office address is Department of Agriculture, Washington, D. C.,) have invented a new and useful Process for Oxidizing the Side Chains of Aromatic Hydrocarbons.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty.

My invention relates to a process for oxidizing the side chains of aromatic hydrocarbons. My invention constitutes certain steps hereinafter described and specifically set forth in the claims. The following description sets forth in detail certain steps embodying my invention, and such disclosed steps constitute but one of the various ways in which the principle of my invention can be used.

Some of the various methods by which the side chains of aromatic hydrocarbons have been oxidized are as follows:

1. The treatment of liquids, such as toluene and other aromatic hydrocarbons having side chains, with various oxidizing agents, such as manganese dioxid and sulfuric acid, chromyl chlorid, oxids of cobalt and nickel, with or without sulfuric acid and other oxidizing substances.

2. The exposure of vaporized toluene mixed with air to the influence of catalyzers, consisting of oxids of iron, nickel and copper and carbon (Chasy, Delage and Woog, French Patent No. 379715, July 8, 1907, catalytic process of manufacturing benzaldehyde and benzoic acid).

My invention relates to a method for oxidizing the side chains of aromatic hydrocarbons, the hydrocarbons being first transformed into the gaseous condition and mixed with atmospheric air or oxygen and conducted at various temperatures over catalysts which assist in the union of the oxygen with the side chains of the hydrocarbons. I have discovered that various catalysts can be used for the purpose and have succeeded in producing reactions with platinum and various platinized materials, such as asbestos, oxids of the various metals, aluminum, antimony, bismuth, cerium, chromium, silver, cobalt, magnesium, molybdenum, tin, titanium, tungsten, uranium, vanadium and zinc, and also various other substances in fine and coarse state of division, such as pieces of porcelain, kaolin, and other substances. I have also found that in certain cases mixtures of these catalysts produce better results than the catalysts in the pure condition.

The reaction between the hydrocarbons and the oxygen is started by raising the catalyst to a temperature between 200 and 400 degrees, centigrade, and then passing the mixture of the oxygen or atmospheric air or oxygen-containing gas with the hydrocarbons in the gaseous phase over or through the catalyst. In the case of a number of the catalysts mentioned the heat of combustion is sufficient to maintain the proper temperature for the continuation of the reaction without the further application of heat. In the case of some of the catalysts above listed it is necessary to continuously apply heat in order to maintain the proper temperature for the reaction.

In the case of some of the catalysts above mentioned it is necessary to employ an oxygen-containing gas mixture rich in oxygen gas in order to produce the maximum yields of the products of the reaction and in other cases atmospheric air may be employed.

Many of the catalysts above enumerated are superior to the oxids of iron, nickel and copper and carbon, which are mentioned in the French Patent No. 379715, July 8 1907, and I have produced yields far in excess of any which it is possible to obtain by these catalysts when I employ the oxids of vanadium, and herein lies the difference and superiority of my process over any other.

In the case of toluene I have found that on mixing the vaporized hydrocarbon with air or with oxygen, preferably air, and passing the mixture in the gas phase into a chamber containing the catalyst, consisting of oxids of vanadium, raised to a temperature between 200 and 400 degrees centigrade, preferably, the reaction proceeds smoothly with the production of benzaldehyde and benzoic acid, and there is collected in the receiving vessel a mixture of benzaldehyde, benzoic acid and unchanged toluene and some water. The yields of the valuable products, namely, benzaldehyde and benzoic acid, are greatly in excess of any yields which have been obtained with other catalysts and the catalytic action of the oxids of vanadium is much better than that of the oxids of iron, nickel and copper and carbon, and the process can be continuously operated. The toluene may be separated by fractional distillation, mixed with atmospheric air or oxygen and again passed over the catalyst. By proper arrangement of the temperature of the receiving vessel the products of the reaction, benzaldehyde and benzoic acid, condense, while the toluene remains in the form of a gas and is again circulated through the same apparatus or through a similar apparatus after it is mixed with the atmospheric air or oxygen.

The products of the reaction, benzaldehyde and benzoic acid, may be separated by a number of well-known processes, including distillation, separation of the benzaldehyde by means of sulfite, the removal of benzoic acid as a salt of sodium or of calcium, and other processes.

Having thus described my invention, I claim:

1. A process for oxidizing the side chains of aromatic hydrocarbons by passing the vaporized hydrocarbons mixed with atmospheric air over a catalyst consisting of the oxids of vanadium at temperatures between 200 and 400 degrees centigrade.

2. A process for producing benzaldehyde and benzoic acid from toluene by passing the vaporized hydrocarbon mixed with oxygen over a catalyst consisting of the oxids of vanadium, the catalyst and the mixture of gases being maintained at temperatures between 200 and 400 degrees centigrade.

In testimony whereof, I affix my signature in the presence of two subscribing witnesses.

HARRY D. GIBBS.

Witnesses:
LAURA A. SKINNER,
R. R. WILLIAMS.